United States Patent
Lanfermann

(10) Patent No.: US 8,035,620 B2
(45) Date of Patent: Oct. 11, 2011

(54) MOVING OBJECTS PRESENTED BY A TOUCH INPUT DISPLAY DEVICE

(75) Inventor: Gerd Lanfermann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1122 days.

(21) Appl. No.: 11/813,605

(22) PCT Filed: Jan. 6, 2006

(86) PCT No.: PCT/IB2006/050052
§ 371 (c)(1),
(2), (4) Date: Jul. 10, 2007

(87) PCT Pub. No.: WO2006/075267
PCT Pub. Date: Jul. 20, 2006

(65) Prior Publication Data
US 2008/0136786 A1    Jun. 12, 2008

(30) Foreign Application Priority Data
Jan. 14, 2005 (EP) .................................. 05100214

(51) Int. Cl.
*G09G 5/00* (2006.01)

(52) U.S. Cl. ........ 345/173; 345/104; 345/174; 345/175; 463/37

(58) Field of Classification Search .......... 345/173–177, 345/104; 178/18.03–18.09; 715/863, 864; 463/37, 38
See application file for complete search history.

(56) References Cited

U.S. PATENT DOCUMENTS

| 5,714,978 | A | 2/1998 | Yamanaka et al. | |
| 5,844,547 | A * | 12/1998 | Minakuchi et al. | 345/173 |
| 5,956,021 | A | 9/1999 | Kubota et al. | |
| 6,040,825 | A * | 3/2000 | Yamamoto et al. | 345/173 |
| 7,231,609 | B2 * | 6/2007 | Baudisch | 715/769 |
| 7,345,675 | B1 * | 3/2008 | Minakuchi et al. | 345/173 |
| 7,411,575 | B2 * | 8/2008 | Hill et al. | 345/156 |
| 2002/0008691 | A1 | 1/2002 | Hanajima et al. | |
| 2002/0018051 | A1 * | 2/2002 | Singh | 345/173 |
| 2003/0117490 | A1 | 6/2003 | Tecu et al. | |
| 2003/0169239 | A1 | 9/2003 | Nakano et al. | |
| 2004/0021643 | A1 | 2/2004 | Hioshino et al. | |
| 2004/0100451 | A1 * | 5/2004 | Okada | 345/173 |
| 2004/0183833 | A1 | 9/2004 | Chua | |

FOREIGN PATENT DOCUMENTS

| EP | 0618528 B1 | 10/1994 |
| EP | 1098241 A2 | 5/2001 |
| WO | 0231807 A1 | 4/2002 |
| WO | 2004051451 A2 | 6/2004 |

\* cited by examiner

*Primary Examiner* — Lun-Yi Lao
*Assistant Examiner* — Tom Sheng

(57) ABSTRACT

The invention concerns a method, touch input display device and computer program product for moving at least one object presented by the touch input display device. In the touch input display device it is detected that a touching member (46) is at least in close proximity of a first object (38) at a first location provided by the touch input display device, a distancing factor of the first object caused by the detection of the touching member is determined and the first object is moved in a direction and a distance selected according to the distancing factor for presenting the object at a second location. The invention allows the rearranging of objects provided by the device such that they better suit a user.

10 Claims, 5 Drawing Sheets

MOVING OBJECTS PRESENTED BY A TOUCH INPUT DISPLAY DEVICE

TECHNICAL FIELD

The present invention is generally related to the field of touch input display devices and more particularly towards a method, touch input display device and computer program product for moving at least one object presented by the touch input display device.

BACKGROUND OF THE INVENTION

It has become more and more popular to provide touch input display devices in different types of systems and devices, like for instance in cellular phones, lap top computers and PDAs. On such a display it is then possible to provide icons, a keyboard or a keypad, which activates a function or enters letters, numbers or symbols when a user directly or via some instrument contacts or is close to physical contact with the display. Activation can be provided either by the fingers of the user or other input devices like for instance a pen.

These devices are however very often small in size and uncomfortable for a user to use for entering information, perhaps because the user is provided with big hands, is left handed or has a general feeling of being uncomfortable.

In these cases it would be advantageous for the user to be able to move the objects provided on the display, like for instance keys in a keypad in order to better adapt to his personal way of using the device.

It is known to provide icons on a touch input display device that can be moved. In for instance US2002/0008691, there is described how icons on a display can be moved. Here an icon is moved through a first click on it in order to activate it and thereafter the icon can be moved on the display by using a finger. Moving is then carried out through dragging the object with the use of the finger. The document also describes how a pressure applied in a vertical direction on the object is used for determining if a move is to be made or if an activation of a function associated with the object is to be made. However, since the described moving is related to pressure, the document is limited to devices that allow pressure to be detected.

In view of this it would be beneficial to provide an improved touch input display device allowing simpler relocation of displayed objects.

SUMMARY OF THE INVENTION

The present invention is therefore directed towards solving the above-mentioned problem of providing an improved way to relocate displayed objects in a touch input display device.

According to a first aspect of the present invention, this object is achieved by a method of moving at least one object presented by a touch input display device comprising the steps of:
  detecting a touching member at least being in close proximity of a first object at a first location provided by the touch input display device,
  determining a distancing factor of the first object caused by the detection of the touching member, and
  moving the first object in a direction and a distance selected according to the distancing factor for presenting the object at a second location.

According to a second aspect of the present invention, the object is also achieved by a touch input display device for allowing movement of at least one presented object and comprising:
  an information presentation unit arranged to present a number of objects,
  a touch detecting unit arranged to detect a touching member at least being in close proximity of a first object at a first location provided by the touch input display device, and
  a control unit arranged to:
    control the presenting of objects by the information presentation unit,
    determine a distancing factor of the first object caused by the detection of the touching member, and
    order the information presentation unit to move the first object in a direction and a distance selected according to the distancing factor for presenting the object at a second location.

According to a third aspect of the present invention, the object is also achieved by a computer program product for allowing movement of at least one object presented in a touch input display device, comprising computer program code, to make a computer execute, when said program code is loaded in the computer:
  detect a touching member at least being in close proximity of a first object at a first location provided by the touch input display device,
  determine a distancing factor of the first object caused by the detection of the touching member, and
  move the first object in a direction and a distance selected according to the distancing factor for presenting the object at a second location.

With the present invention there are associated a number of advantages. The invention allows the use of one touch of an object to determine the movement of an object. In this way drag and drop operations are not needed. The invention furthermore allows the rearranging of objects, which is of advantage if a user has special needs regarding the outline of objects in a touch input display device.

According to claim 2 touching member actions or effects caused by touching member actions at a peripheral area of the first object are detected. This feature has the advantage of allowing determination of distance and direction by looking at the peripheral region. In this way it is possible to move the object if this region is effected and not move the object if the region is not effected.

According to claim 3, the touch input device comprises a set of display elements and said first object is made up of a group of display elements adjacent each other. This feature has the advantage of simplifying determination for what part of an object a touching member is being detected or has caused an effect.

According to claim 4 the first object is provided as a number of flexible display elements that have been physically raised in relation to at least display elements neighboring said first object, the detecting comprises detecting a shear force on the first object caused by a touch of the touching member, and the determining of the distancing factor comprises determining a distancing factor that is dependent on the shear of said first object. This feature has the advantage of providing an object that is tactile. Another advantage is that the size and direction of movement is detected through the horizontal force applied on it, which simplifies the identification of the intention of a user to move the object.

According to claim 5 the vertical force applied on the first object by the touching member is detected and determining of if the first object is to be moved is based on the vertical force applied. This feature has the advantage of allowing the discrimination between if a selection has been made to move an object or to activate the object.

According to claim 6 the touching member is detected if it is at least being in close proximity of at least one first display element of the first object and the distancing factor is determined via determining the location of the first display element in relation to at least one second center display element of the first object. This feature allows a simple and effective determination of if an object is to be moved if forces cannot be detected.

According to claim 7 the object is presented at intermediate locations along the direction between the first and the second locations. This feature has the advantage of presenting the movement of the object in a continuous user friendly way.

According to claim 8 the touch input display device comprises a set of objects, wherein the detecting of a touching member, determining of a distancing factor and moving are performed for a second object, whereupon rearranging takes place of the other objects of the set based on the movement of the first and second objects. This feature has the advantage of allowing a simple rearranging of a whole set of objects based on the movement of a limited number of objects and is thus very user friendly.

The basic idea of the present invention is to detect a touching member at least being in close proximity of an object provided by a touch input display device, to determine a distancing factor of the object caused by the detection, and move the object in a direction and a distance selected according to the distancing factor. In this way rearranging of objects is allowed for satisfying the needs of a user.

The above mentioned and other aspects of the invention will be apparent from and elucidated with reference to the embodiments described hereinafter.

BRIEF DESCRIPTION OF THE DRAWINGS

The present invention will be further described in relation to the accompanying drawings, in which.

DETAILED DESCRIPTION OF THE INVENTION

The present invention is generally directed towards touch input display devices and more particularly towards touch input display devices arranged to move objects when being activated by a user.

Figure 1:
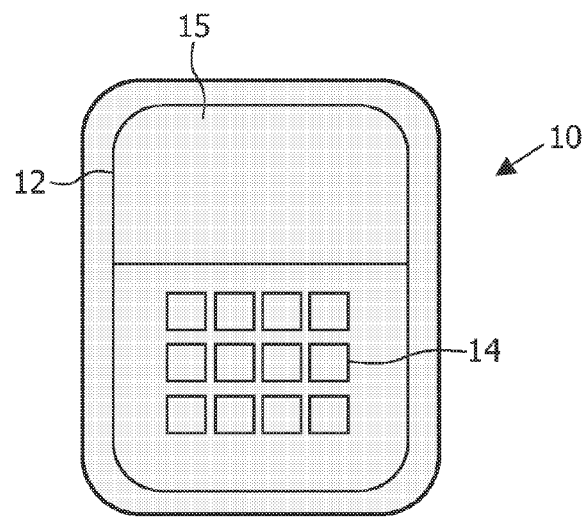
FIG. 1 schematically shows a general touch input display device.

FIG. 1 schematically shows a touch input display device 10 in the form of a PDA (Personal Digital Assistant) having a display 12 on which touch inputs can be made. The display here shows a keypad 14 with keys that can be selected as well as a general information display window 15, where the window shows information relating to inputs made via the keypad 14. It should be realized that this is just one variation of a touch input display device. There can be several other types, like a touch input display device in a lap top computer or in a cellular phone as well as a touch input display device being connected to a PC or other type of computer. The display is made up of a number of display elements, here in the form of pixels. Some of these elements are then showing information in the form of objects, like keys or icons. For each display element there is furthermore provided an input element that can receive touch inputs. When an area displaying an object is then touched some actions are performed for that object.

Figure 2:
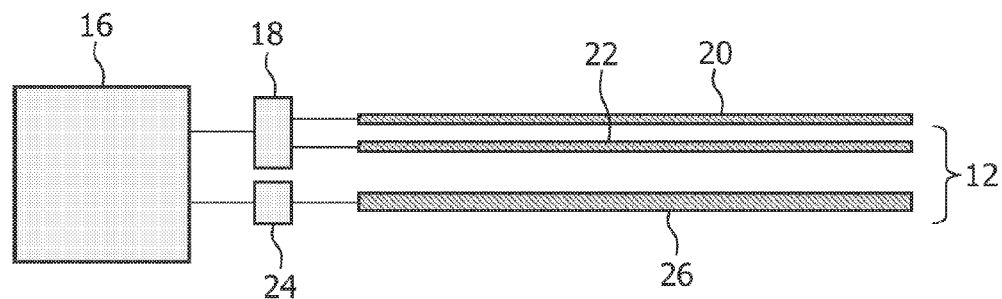
FIG. 2 schematically shows main units of a touch input display device according to a first embodiment of the present invention, FIG. 3 schematically shows main units of a touch input display device according to a second embodiment of the present invention, FIG. 4 schematically shows main units of a touch input display device according to a third embodiment of the present invention.

FIG. 2 schematically shows the main units of a touch input display device according to a first embodiment of the present invention. The display 12 includes a number of layers 20, 22 and 26. The device furthermore includes a control unit 16 for controlling display of information and determination of touched objects. The display 12 includes an information presentation unit in the form of a first information presentation layer 26 on which information is displayed via a display driving unit 24 under the control of the control unit 16. The information presentation layer 26 is preferably provided in the form of an LCD display (Liquid Crystal Display) and then of A TFT type, although the invention is in no way limited to this. It can just as well another type, like a CRT. There is also provided a touch detecting unit in the form of first and a second information receiving plates 20, 22, of which at least the first 20 is flexible. The two plates are connected to a information reading unit 18, which in turn is connected to the control unit 16. This display works in the way that a depressing of the first plate 20 makes it come in contact with the second plate 22. The position of the contact is then converted to an electric signal that is fed to the control unit 16 by the information reading unit 18, thus enabling registering of the position as a selection of a displayed object. It is here also sometimes possible to detect the pressure with which the first plate 20 is depressed. This type of display is the normal touch input display used in many touch input display devices.

Figure 3:
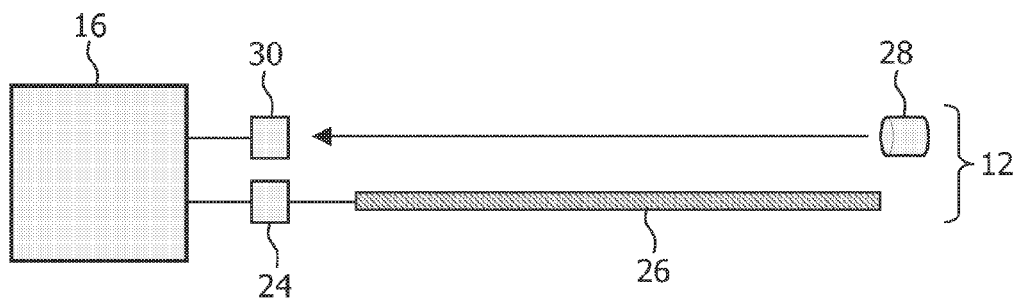

FIG. 3 schematically shows a variation of the touch input display device according to a second embodiment of the present invention. Here there is, as in FIG. 2, an information presentation layer 26. However, the touch detecting unit is provided through a light source 28 and a detector 30, where the light source 28 scans the surface of the information presentation layer 26, the light of which is received by the detector 30, which is connected to the control unit 16. Upon touching or providing a touching member close to the information presentation layer 26 the ray of light generated by the light source is broken, where the position can be converted to a position and used for determining an area selected by a user. This technique also follows well known principles. However there does not have to be a touch of the display surface in order to indicate a selection of objects, it is sufficient that a touching member, like the finger of a user or another object like a pen, is brought close to the display surface.

Figure 4:
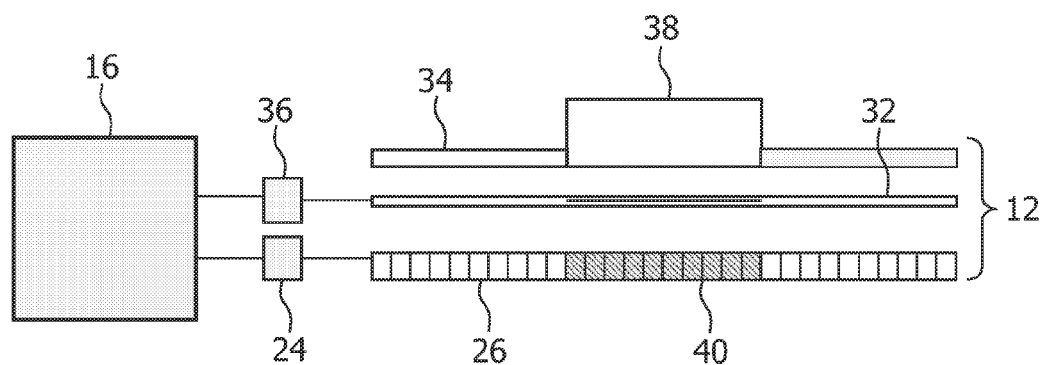

FIG. 4 schematically shows a display according to a third and presently contemplated preferred embodiment of the present invention. As before there is an information presentation layer 26 showing visual information, which layer has been divided into a number of display elements. Above the information presentation layer 26 there is provided a sensing and control layer 32 of piezoelectric material. This layer is controlled by a piezoelectric driving unit 36, which is also connected to the control unit 16. Here there is also provided a layer of flexible material 34, which the control unit 16 makes the sensing and control layer 32 to raise in selected areas that are to be presented as an object 38. The information presentation layer 26 and the layer of flexible material 34 here form an information presentation unit, while the sensing and control layer 32 forms a touch detecting unit. Here a number of display elements are being raised by the piezoelectric material such that an object 38 like a key appears on the display. Additional information 40 relating to this object 38 is at the same time displayed in the information presentation layer 26, which information is indicated by a hatched area. The object can be depressed. Upon depression of the object 38 the sensing and control layer 32 senses the pressure or force and converts it to an electric signal that can be processed by the control unit 16. The processing of such a signal will be described in more detail shortly.

Figure 5:
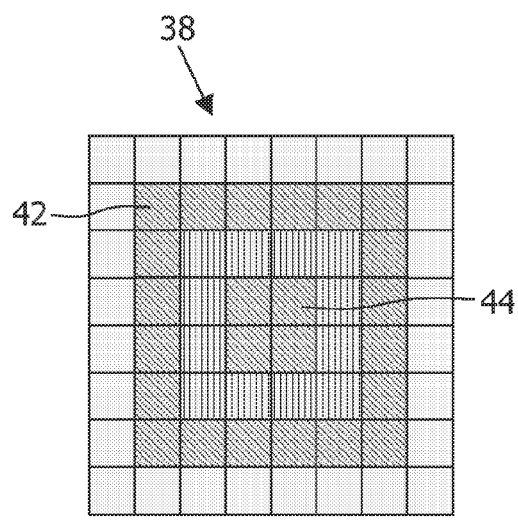
FIG. 5 shows the provision of an object on a display of a touch input display device, FIG. 6A schematically shows the provision of an object on a touch input display device according to the third embodiment before being touched by a user, FIG. 6B schematically shows the provision of the object on the touch input display device according to the third embodiment as it is being touched by a user, FIG. 6C schematically shows the moving of the object on the touch input display device according to the third embodiment after being touched by a user.

FIG. 5 schematically shows a key 38 that is provided on a display. As can be seen from the figure the key 38 is made up a number of display elements adjacent each other and here shown as a 6×6 square of these elements, indicated by a hatched area. In the figure there is also shown a centre area 44 made up of the four display elements in the middle of the square and a peripheral area 48 made up of the display elements in the key 38 that run along the perimeter or circumference of the square, where these areas will be described in more detail later. The centre area 44 and the peripheral are shown with diagonal hatches, while an area of the object in-between is shown with vertical hatches. It should here be realized that the size of the key is only shown as an example for describing the invention. The key is furthermore just an example of an object and may furthermore be such things as a an icon or some other type of object that the user can influence. The peripheral area might furthermore be wider and the centre area might be wider as well as smaller. In fact it can be as small as one display element in the middle of the object. Naturally the object need not be shaped as a square, but can have any other form that can be provided by the display elements.

Figure 6A:
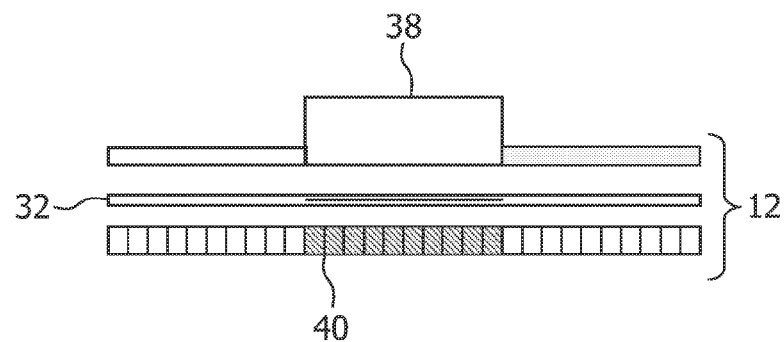
Figure 6B:
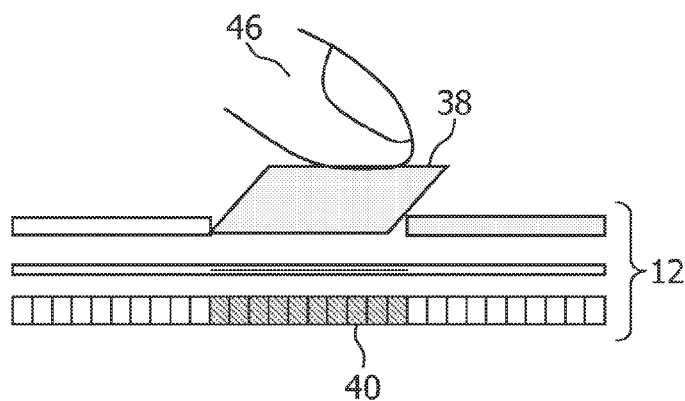
Figure 6C:
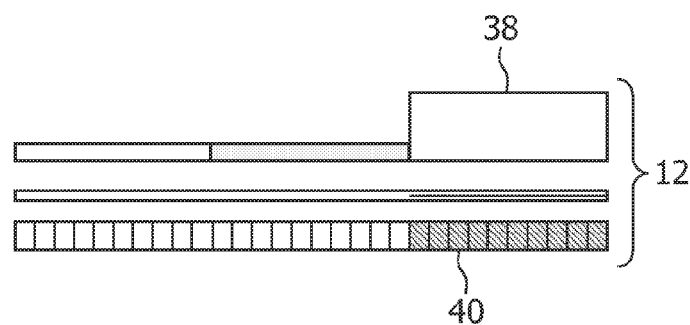
Figure 7:
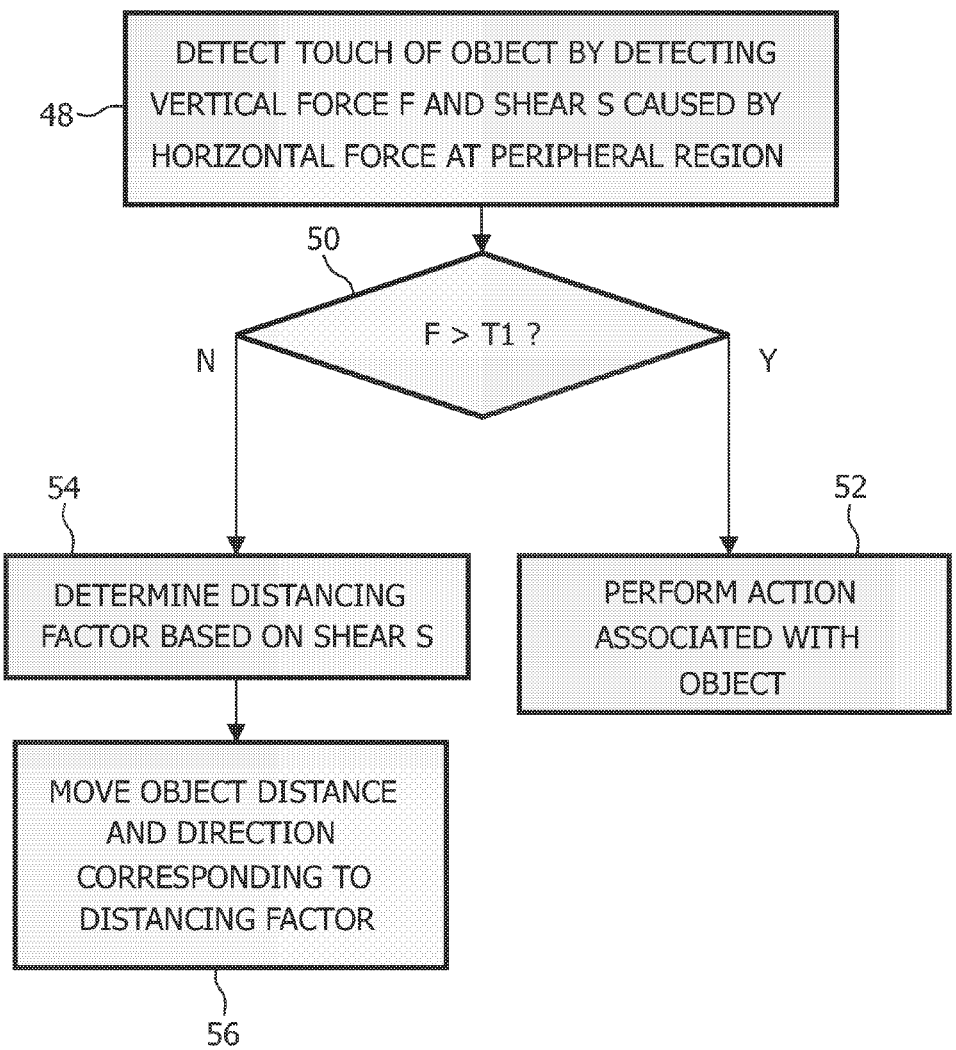
FIG. 7 shows a flow chart of a method of moving an object according to the third embodiment, FIG. 8 schematically shows a number of objects on a display, where two are being moved by a user, FIG. 9 schematically shows the objects of FIG. 8, where the rest of the objects have been moved in line with the objects moved by the user, and FIG. 10 schematically shows a computer program product in the form of a CD Rom disc comprising computer program code for performing the present invention.

FIG. 6A-6C shows how an object is being depressed in the display device according to the third embodiment and how the object is being moved in dependence thereof. FIG. 7 shows a flow chart of a method of moving an object according the present invention.

The general way the invention according to the preferred embodiment of the present invention is working will now be described with reference being made to FIGS. 6 and 7.

The control unit first makes the sensing and control layer 32 provide an object 38 on the display by raising a part of the flexible material layer 34 in the display element positions that are to represent the object. This raised part is a first position of the object, which is shown as a middle area in the layer 34 shown in FIG. 6A. At the same time the control unit makes the information presentation layer 26 display information 40 below the object 38. The object is here provided in the form of a key and the information displayed is information regarding the meaning of the key, like for instance the letter "k". The piezoelectric material of the sensing and control layer 32 is capable of detecting vertical forces as well as tangential forces, which tangential forces gave raise to shear forces within the material. The control unit thus awaits user inputs via the display. When the user then touches the key with his finger 46, which is shown in FIG. 6B, the touch is detected, step 56, which detection is made using the piezoelectric material of the sensing and control layer 32, which converts a force being applied to the flexible material layer 34 into electric signals. The touch is here made up of a vertical component and a horizontal component. As the object is being moved horizontally, at least one edge thereof, which edge is provided in the peripheral area of the object, is forced against the surrounding non-raised material of the layer 34. This forcing against the surrounding non-raised material is an effect on the object caused by the touch of the finger 46. This creates a shear force S within the flexible material that is sensed by the sensing and control layer 32. Also a vertical force F is here detected. The forces are here provided in the area of the sensing and control layer 32 corresponding to the affected display elements, i.e., the display elements in the peripheral region. The two forces are then converted to at least one electrical signal that is transferred to the control unit. Thereafter the control unit compares the vertical force F with a threshold T1. If the vertical force is higher than the threshold T1, step 50, the touch is interpreted as being a selection of the function of the key and not as a moving of the key, and therefore the control unit performs the action associated with the key, step 52. If however the vertical force was below the threshold T1, step 50, the control unit assumes that the user input was a selection to move the key. Based on the shear force part of the signal, the control unit then determines a distancing factor based on the shear S, step 54. Thereafter the control unit orders the moving of the object by a distance and in a direction determined by the distancing factor, step 56. The object is thus moved to a second position determined by the distancing factor. The control unit does this by making the sensing and control layer 32 lower the pushed region and raise another region in the direction that the object was pushed. In FIG. 6C this is shown as being the neighboring area to the right of the middle area. At the same time the control unit makes the information presentation layer to show the same information 40 under the newly raised area.

In this way it is possible to move an object like a key by looking at the horizontal force applied.

The different method steps performed are also provided in table I, shown below.

TABLE I

| | |
|---|---|
| 48 | DETECT TOUCH OF OBJECT BY DETECTING VERTICAL FORCE F AND SHEAR S CAUSED BY HORISONTAL FORCE AT PERIPHERAL REGION |
| 50 | F > T1 ? |
| 52 | PERFORM ACTION ASSOCIATED WITH OBJECT |
| 54 | DETERMINE DISTANCING FACTOR BASED ON SHEAR S |
| 56 | MOVE OBJECT DISTANCE AND DIRECTION CORRESPONDING TO DISTANCING FACTOR |

The present invention has a number of advantages. It allows the use of one touch of an object to determine the movement of the object. In this way drag and drop operations are not needed. The invention furthermore allows the rearranging of objects, which is of advantage if a user has special needs regarding the outline of objects in a touch input display device. The flexible material allows the provision of an object that is tactile. Another advantage is that the size and direction of movement is detected through the horizontal force applied on an object, which simplifies the identification of the intention of a user to move it. By detecting the vertical force it is possible to discriminate between if a selection has been made to move an object or to activate the object in a simple manner.

It is possible that the control unit did not look at the vertical force; in that case it is possible to compare the shear S with a threshold and move the object if the shear is high enough.

In the first and second embodiment described above, it is not possible to look at the shear. It might also not be possible to study the vertical pressure. In this case it is possible to look at if the object was "touched" in the peripheral area 42, shown in FIG. 5. In case it was "touched" in the peripheral area 42, this is then taken as an indication that the object is to be moved. The amount of movement and the direction is then decided by the difference between the touched position and the centre area 44. This principle is furthermore possible to apply on a display element by display element basis, i.e. by comparing the touched element with a centre element and determining that a move is to be made if the distance is above a certain threshold. It is furthermore possible to also use this in the third embodiment either instead of or as a complement to determining the shear. By looking at a peripheral region, it is possible to move the object if this region is effected and not move the object if the region is not effected, which simplifies the determination for what part of an object a touching member is being detected or has caused an effect. By looking at the difference between a "touched" display element and a centre display element of an object a simple and effective determination of if the object is to be moved is provided if forces cannot be detected.

Another possible variation of all embodiments is that it is also possible to have a certain object moving mode, which can be selected by selecting a particular key. In this mode all object touches are determined to be movement of the object in question.

Figure 8:
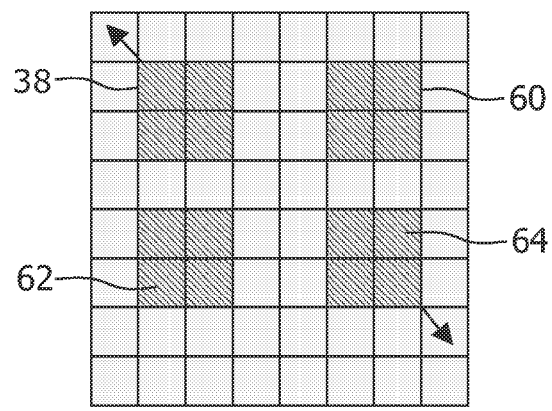
Figure 9:
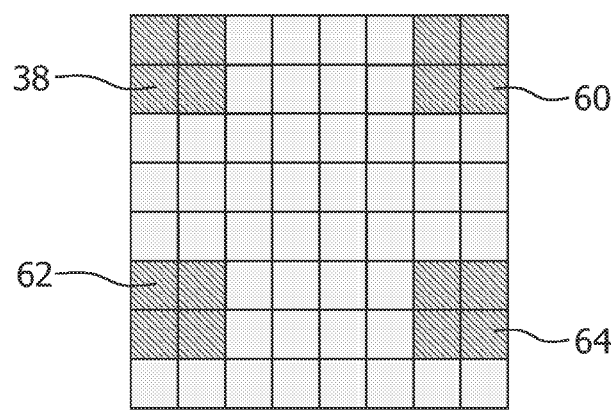

There is a further variation of the present invention that is possible to make, which variation will now be described with reference being made to FIGS. 8 and 9 that show a set of objects that can be a keyboard or a keypad. For the sake of simplicity each figure only shows four objects. It should be realized that as few as three could be shown or that there could be more objects shown. In the figures there is thus shown a first 38, a second 60, a third 62 and a fourth 64 object. In FIG. 8 the user moves the first object 38 diagonally upwards to the left and the fourth object 64 diagonally downwards to the right, which is indicated by arrows. The distance moved in this example is, also for the sake of simplicity, only a movement by one display element. Once these movements have been registered by the control unit, it then goes on and moves also the second and third objects 60 and 62 in the same way, diagonally upwards to the right and diagonally downwards to the left, respectively. Thus the non-"touched" objects are rearranged in accordance with the movement of the touched objects. In this way the control unit looks at the two objects moved and moves the rest of the objects of a set of objects like a key pad in a similar fashion. In this way it is for instance possible for a user to enlarge a keyboard to better suit his hands in a simple and quick way with a limited number of operations on a limited number of objects, which is very user friendly. It should be realized that other ways to intelligently move objects based on two moved objects can be contemplated.

Another variation that is possible in the present invention is to show the object when it is being moved. The control unit thus calculates a second position based on the original first position of the object and then displays the object along the determined direction, in order to show the movement. In this way it is possible to animate the movement for showing the user how the object moves. This animation can furthermore be combined with an acceleration and deceleration of the presented movement such that the object is moved with increasing speed at the beginning of the movement and with a decreasing speed at the end of the movement. This variation has the advantage of presenting the movement of the object in a continuous user friendly way.

Figure 10:
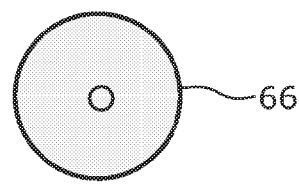

The control unit can be implemented in any suitable form including hardware, software, firmware or combinations of these. However, preferably, it is implemented as computer software stored in a program memory and run on one or more data processors and/or digital signal processors. The program code can also be provided on a computer program product, of which one is shown in FIG. 10 in the form of a CD ROM disc 66. This is just an example and various other types of computer program products are just as well feasible like memory sticks. The computer program product can also be provided in pure program code that can be downloaded for instance from a further server, perhaps via the Internet.

There are several more variations that are possible to the present invention. The invention was earlier described in relation to a two-dimensional display. It should be realized that the invention is not limited to this scenario. The teachings of the present invention can just as well be applied in a three-dimensional structure, where objects are shown three-dimensionally, perhaps using holograms.

The elements and components of an embodiment of the invention may be physically, functionally and logically implemented in any suitable way. Indeed the functionality may be implemented in a single unit, in a plurality of units or may be physically and functionally distributed between different units and processors Although the present invention has been described in connection with specific embodiments, it is not intended to be limited to the specific form set forth herein. Rather, the scope of the present invention is limited only by the accompanying claims. In the claims, the term comprising does not exclude the presence of other elements or steps. Furthermore, although individually listed, a plurality of means, elements or method steps may be implemented by e.g. a single unit or processor. Additionally although individual features may be included in different claims, these may possibly be advantageously combined and the inclusion in different claims does not imply that a combination of features is not feasible and/or advantageous. In addition singular references do not exclude a plurality. Thus references to "a", "an", "first", "second" etc. do not preclude a plurality. Reference signs in the claims are provided merely as a clarifying example and shall not be construed as limiting the scope of the claims in any way.

The invention claimed is:

1. Method of moving at least one object presented by a touch input display device comprising the steps of:
   detecting a touching member at least being in close proximity of a first object at a first location provided by the touch input display device,
   determining a distancing factor of the first object caused by the detection of the touching member, and
   moving the first object in a direction and a distance selected according to the distancing factor for presenting the object at a second location;
   wherein the touch input device comprises a set of display elements, and said first object is made up of a group of display elements adjacent each other; and,
   wherein the step of detecting comprises detecting the touching member at least being in close proximity of at least one first display element of said first object and the step of determining the distancing factor comprises determining the location of said first display element in relation to at least one second center display element of the first object.

2. Method according to claim 1, further comprising the step of presenting the object at intermediate locations along said direction between said first and the second locations.

3. Method of moving at least one object presented by a touch input display device comprising the steps of:
   detecting a touching member at least being in close proximity of a first object at a first location provided by the touch input display device,
   determining a distancing factor of the first object caused by the detection of the touching member, and
   moving the first object in a direction and a distance selected according to the distancing factor for presenting the object at a second location;
   wherein the touch input device comprises a set of display elements and said first object is made up of a group of display elements adjacent each other; and
   where said first object is provided as a number of flexible display elements that have been physically raised in relation to at least display elements neighboring said first object, the step of detecting comprises detecting a shear force on the first object caused by a touch of the touching member, and the step of determining the distancing factor comprises determining a distancing factor that is dependent on the shear of said first object.

4. Method according to claim 3, further comprising the step of detecting the vertical force applied on said first object by the touching member and determining if said first object is to be moved based on the vertical force applied.

5. Method according to claim 3, wherein the touch input display device comprises a set of objects, the steps of detecting, determining the distancing factor and moving are performed for a second object, and further comprising the step of rearranging the other objects of the set based on the movement of the first and second objects.

6. Method of moving at least one object presented by a touch input display device comprising the steps of:
   detecting a touching member at least being in close proximity of a first object at a first location provided by the touch input display device,
   determining a distancing factor of the first object caused by the detection of the touching member, and
   moving the first object in a direction and a distance selected according to the distancing factor for presenting the object at a second location; and,
   wherein the touch input display device comprises a set of objects, the steps of detecting, determining the distancing factor and moving are performed for a second object, and further comprising the step of rearranging the other objects of the set based on the movement of the first and second objects.

7. Touch input display device for allowing movement of at least one presented object and comprising:
   an information presentation unit arranged to present a number of objects,
   a touch detecting unit arranged to detect a touching member at least being in close proximity of a first object at a first location provided by the touch input display device, and
   a control unit arranged to:
      control the presenting of objects by the information presentation unit,
      determine a distancing factor of the first object caused by the detection of the touching member, and
      order the information presentation unit to move the first object in a direction and a distance selected according to the distancing factor for presenting the object at a second location;
   wherein the touch input device further comprises a set of display elements and said first object is made up of a group of display elements adjacent each other; and
   where said first object is provided as a number of flexible display elements that have been physically raised in relation to at least display elements neighboring said first object, and the touch detecting unit is further arranged to detect a shear force on the first object caused by a touch of the touching member, and to determine the distancing factor at least in part by using the shear of said first object.

8. The display device according to claim 7, wherein the touch input display device comprises a set of objects; the control unit functions of detecting, determining the distancing factor and moving are performed for a second object; and control unit is further arranged to rearrange the other objects of the set based on the movement of the first and second objects.

9. Computer program product for allowing movement of at least one object presented by a touch input display device, comprising computer program code stored on a non-transitory computer readable medium, to make a computer execute the following steps, when said program code is loaded in the computer:
   detecting a touching member at least being in close proximity of a first object at a first location provided by the touch input display device,
   determining a distancing factor of the first object caused by the detection of the touching member, and
   moving the first object in a direction and a distance selected according to the distancing factor for presenting the object at a second location;
   wherein the touch input device comprises a set of display elements and said first object is made up of a group of display elements adjacent each other; and
   where said first object is provided as a number of flexible display elements that have been physically raised in relation to at least display elements neighboring said first object, the step of detecting comprises detecting a shear force on the first object caused by a touch of the touching member, and the step of determining the distancing factor comprises determining a distancing factor that is dependent on the shear of said first object.

10. The computer program product according to claim 9, wherein the touch input display device comprises a set of objects; and the steps of detecting, determining the distancing factor and moving are performed for a second object, and further comprising the step of rearranging the other objects of the set based on the movement of the first and second objects.

* * * * *